United States Patent
Kwon et al.

(10) Patent No.: US 11,846,939 B2
(45) Date of Patent: Dec. 19, 2023

(54) MOBILE VEHICLE, CONTROL METHOD OF MOBILE VEHICLE, AND PATH CONTROL SYSTEM OF MOBILE VEHICLE

(71) Applicant: HANWHA AEROSPACE CO., LTD., Changwon-si (KR)

(72) Inventors: Min Hyeok Kwon, Changwon-si (KR); Kyong Seok Choi, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 179 days.

(21) Appl. No.: 17/145,856

(22) Filed: Jan. 11, 2021

(65) Prior Publication Data
US 2022/0091603 A1 Mar. 24, 2022

(30) Foreign Application Priority Data
Sep. 24, 2020 (KR) .................. 10-2020-0123961

(51) Int. Cl.
*G05D 1/02* (2020.01)
*B60W 30/09* (2012.01)
*G05D 1/00* (2006.01)

(52) U.S. Cl.
CPC .......... *G05D 1/0016* (2013.01); *B60W 30/09* (2013.01); *G05D 1/0214* (2013.01); *B60W 2554/4041* (2020.02)

(58) Field of Classification Search
None
See application file for complete search history.

(56) References Cited

U.S. PATENT DOCUMENTS

| 10,534,366 B2 | 1/2020 | Choi et al. |
| 2010/0036556 A1* | 2/2010 | Na ................ G05D 1/0238 701/25 |

FOREIGN PATENT DOCUMENTS

| KR | 10-0811886 B1 | 3/2008 |
| KR | 10-1907548 B1 | 10/2018 |
| KR | 10-2019-0095622 A | 8/2019 |
| KR | 10-2100477 B1 | 4/2020 |
| WO | 2019212281 A1 | 11/2019 |

OTHER PUBLICATIONS

Huang, Weifeng, Anan Osothsilp, and Farzad Pourboghrat. "Vision-based path planning with obstacle avoidance for mobile robots using linear matrix inequalities." 2010 11th International Conference on Control Automation Robotics & Vision. IEEE, 2010. (Year: 2010).*

Kim, S., Bhattacharya, S. and Kumar, V., 2014, May. Path planning for a tethered mobile robot. In 2014 IEEE International Conference on Robotics and Automation (ICRA) (pp. 1132-1139). IEEE. (Year: 2014).*

* cited by examiner

*Primary Examiner* — Russell Frejd
*Assistant Examiner* — Ana D Thomas
(74) *Attorney, Agent, or Firm* — Sughrue Mion, PLLC

(57) ABSTRACT

A mobile vehicle and a method of controlling the mobile vehicle are provided. The method of controlling the mobile vehicle includes defining a first line between the mobile vehicle and the user, determining a position and a size of each of at least one obstacle having a predetermined relationship with the first line, defining a second line based on the first line, the position of the at least one obstacle, and the size of the at least one obstacle, and controlling the mobile vehicle according to a direction and a size of an external force on the second line.

12 Claims, 10 Drawing Sheets

MOBILE VEHICLE, CONTROL METHOD OF MOBILE VEHICLE, AND PATH CONTROL SYSTEM OF MOBILE VEHICLE

CROSS-REFERENCE TO RELATED APPLICATION

This application is based on and claims priority to Korean Patent Application No. 10-2020-0123961, filed on Sep. 24, 2020, in the Korean Intellectual Property Office, the disclosure of which is incorporated by reference herein in its entirety.

BACKGROUND

1. Field

The disclosure relates to a mobile vehicle controlled based on a line between the mobile vehicle and a user, a control method of the mobile vehicle, and a movement path control system of the mobile vehicle.

2. Description of Related Art

Recently, autonomous mobile robots have been equipped with a function that can cope with the environment by itself without prior knowledge about an unknown environment. Such autonomous mobile robots are used in various fields. For example, autonomous mobile robots perform tasks on behalf of humans, such as helping people with disabilities, transporting goods in factories, exploring space, and performing operations in dangerous environments such as nuclear waste treatment plants or deep seas. In addition, autonomous mobile robots can be used as unmanned vacuum cleaners and unmanned lawn mowers.

Autonomous mobile robots with such various functions are expected to provide individuals the richness of life, and add values to companies through industrialization in various fields.

There are several devices that can move an autonomous mobile robot to a user's desired location. However, these devices are inconvenient for the user as they require the user to manually check the moving position of the autonomous mobile robot. The autonomous mobile robot can cause damage to itself or to an external device by collision. In addition, autonomous mobile robots can inflict physical injury to the user by collision with the user. In order to prevent these problems, the user must pay attention to operating the autonomous mobile robot, and there is an inconvenience of having to manually monitor the movement of the autonomous mobile robot at all times. In addition, in order to manipulate the autonomous mobile robot at the speed and direction intended by the user, there is a problem that a high level of manipulation technology is required.

SUMMARY

One or more embodiments of the inventive concept allow a mobile vehicle, such as a robot, to move more flexibly under the direction of a user.

In addition, one or more embodiments of the inventive concept allow a user to intuitively control a mobile vehicle to avoid obstacles.

Additional aspects will be set forth in part in the description which follows and, in part, will be apparent from the description, or may be learned by practice of the presented embodiments of the disclosure.

In accordance with an aspect of the inventive concept, there is provided a method of controlling a mobile vehicle based on a line between the mobile vehicle and a user. The method includes: defining a first line between the mobile vehicle and the user; determining a position and a size of each of at least one obstacle having a predetermined relationship with the first line; defining a second line based on the first line, the position of the at least one obstacle, and the size of the at least one obstacle; and controlling the mobile vehicle according to a direction and a size of an external force on the second line.

The first line is a string connecting the mobile vehicle to the user, and the defining of the first line includes defining the first line based on at least one of a direction of the string and a length of the string.

The determining of the position of the obstacle and the size of the at least one obstacle includes identifying at least one object within a predetermined threshold distance from at least a portion of the string as the at least one obstacle.

The defining of the second line includes: generating at least one virtual obstacle, wherein a size of the at least one virtual obstacle is enlarged by a predetermined ratio based on the position and the size of each of the at least one obstacle; and based on determining that the first line overlaps the at least one virtual obstacle, defining the second line by deforming at least a partial section of the first line based on an outline of the at least one virtual obstacle.

The defining of the second line includes defining the second line such that a distance between at least a portion of the outline of the at least one virtual obstacle and at least a portion of the second line is equal to or greater than a predetermined threshold distance.

The controlling of the mobile vehicle includes: determining a moving direction of the mobile vehicle based on an angle between a predetermined reference direction with respect to the mobile vehicle and the second line at one or more positions of the mobile vehicle; and determining a moving speed of the mobile vehicle based on an external force acting on the string and a difference in length between the first line and the second line at the one or more positions of the mobile vehicle.

The first line is a virtual line connecting the mobile vehicle to the user in a straight line, wherein the defining of the first line includes defining the first line based on at least one of a direction of the straight line and a length of the straight line.

The first line is a line corresponding to a wireless communication path between the mobile vehicle and a terminal of the user.

The determining of the position of the obstacle and the size of the obstacle includes identifying at least one object that is within a predetermined threshold distance from at least a portion of the first line as the at least one obstacle.

The defining of the second line includes: generating at least one virtual obstacle, wherein a size of the at least one virtual is enlarged by a predetermined ratio based on the position and the size of each of the at least one obstacle; and based on determining that the first line overlaps the at least one virtual obstacle, defining the second line by deforming at least a partial section of the first line based on an outline of the at least one virtual obstacle.

The defining of the second line further includes: generating a plurality of second line candidates; and determining any one of the plurality of second line candidates as the second line according to a predetermined rule.

The defining of the second line includes defining the second line such that a distance between at least a portion of the outline of the at least one virtual obstacle and at least a portion of the second line is equal to or greater than a predetermined threshold distance.

The controlling of the mobile vehicle includes: determining a moving direction of the mobile vehicle based on an angle between a predetermined reference direction with respect to the mobile vehicle and the second line at one or more positions of the mobile vehicle; and determining a moving speed of the mobile vehicle based on at least one of a predetermined reference external force and a difference in length between the first line and the second line at the one or more positions of the mobile vehicle.

In accordance with an aspect of the inventive concept, there is provided a mobile vehicle configured to move along a movement path based on a line between the mobile vehicle and a user. The mobile vehicle includes: a string connection part attached to one end of a string connecting the mobile vehicle to the user; and a processor configured to: define a first line between the mobile vehicle and the user, determine a position and a size of each of at least one obstacle having a predetermined relationship with the first line, define a second line based on the first line, the position of the at least one obstacle, and the size of the at least one obstacle, and control the mobile vehicle according to a direction and a size of an external force on the second line.

In accordance with an aspect of the inventive concept, there is provided a system for controlling a movement path of a mobile vehicle based on a line between the mobile vehicle and a user. The system includes: the mobile vehicle; and a user terminal configured to generate a virtual line between the mobile vehicle and the user, wherein the mobile vehicle includes a processor configured to: define a first line with reference to a wireless communication path between the mobile vehicle and the user terminal, determine a position and a size of each of at least one obstacle having a predetermined relationship with the first line, define a second line based on the first line, the position of the at least one obstacle, and the size of the at least one obstacle, and control the mobile vehicle according to a direction and a size of an external force on the second line.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
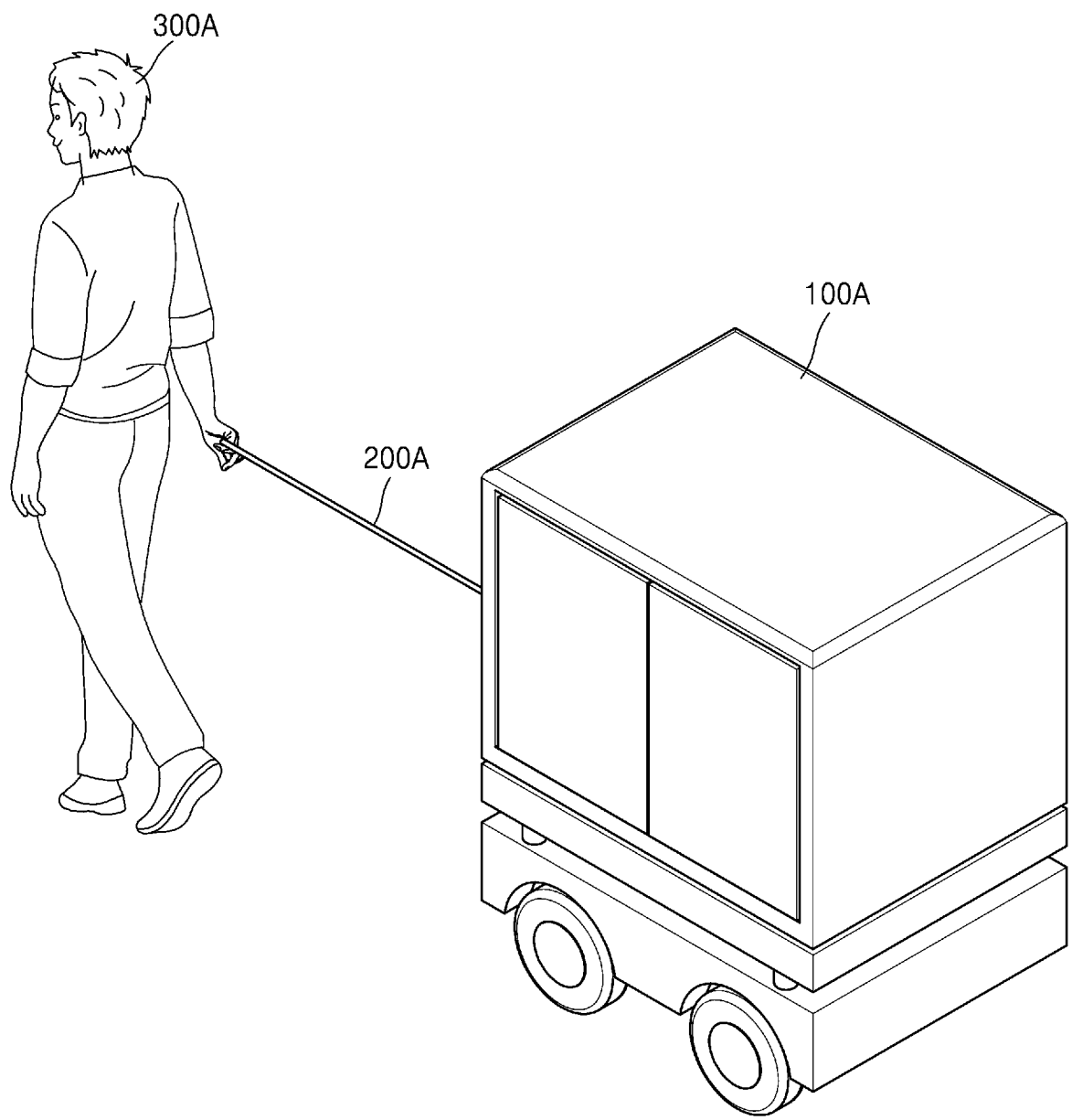
FIGS. 1 and 2 are schematic diagrams illustrating a system for controlling a movement path of a mobile vehicle according to exemplary embodiments.

Reference will now be made in detail to one or more embodiments, examples of which are illustrated in the accompanying drawings, wherein like reference numerals refer to like elements throughout. The present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be understood that when an element is referred to as being "over," "above," "on," "connected to" or "coupled to" another element, it can be directly over, above, on, connected or coupled to the other element or intervening elements may be present. In contrast, when an element is referred to as being "directly over," "directly above," "directly on," "directly connected to" or "directly coupled to" another element, there are no intervening elements present.

The present embodiments can apply various modifications and have various embodiments, and specific embodiments are illustrated with reference to the accompanying drawings and will be described in detail. Effects and features of the present embodiments, and a method of achieving them will be apparent from the embodiments described below in detail together with the accompanying drawings. However, one or more embodiments are not limited to the embodiments disclosed below and may be implemented in various forms.

Hereinafter, embodiments of the inventive concept will be described in detail with reference to the accompanying drawings, and when describing with reference to the drawings, the same or corresponding constituent elements are given the same reference numerals, and redundant descriptions thereof will be omitted.

In the following embodiments, terms such as first and second are not used in a limiting sense, but may be used for the purpose of distinguishing one component from another component. In the following examples, the singular expression includes the plural expression unless the context clearly indicates otherwise. In the following embodiments, terms such as "include" or "have" mean that the features or elements described in the one or more embodiments are present, and do not preclude the possibility of adding one or more other features or elements. In the drawings, components may be exaggerated or reduced in size for convenience of description. For example, the size and shape of each component shown in the drawings are arbitrarily shown for convenience of description, and thus the present disclosure is not necessarily limited to what is shown.

Figure 2:
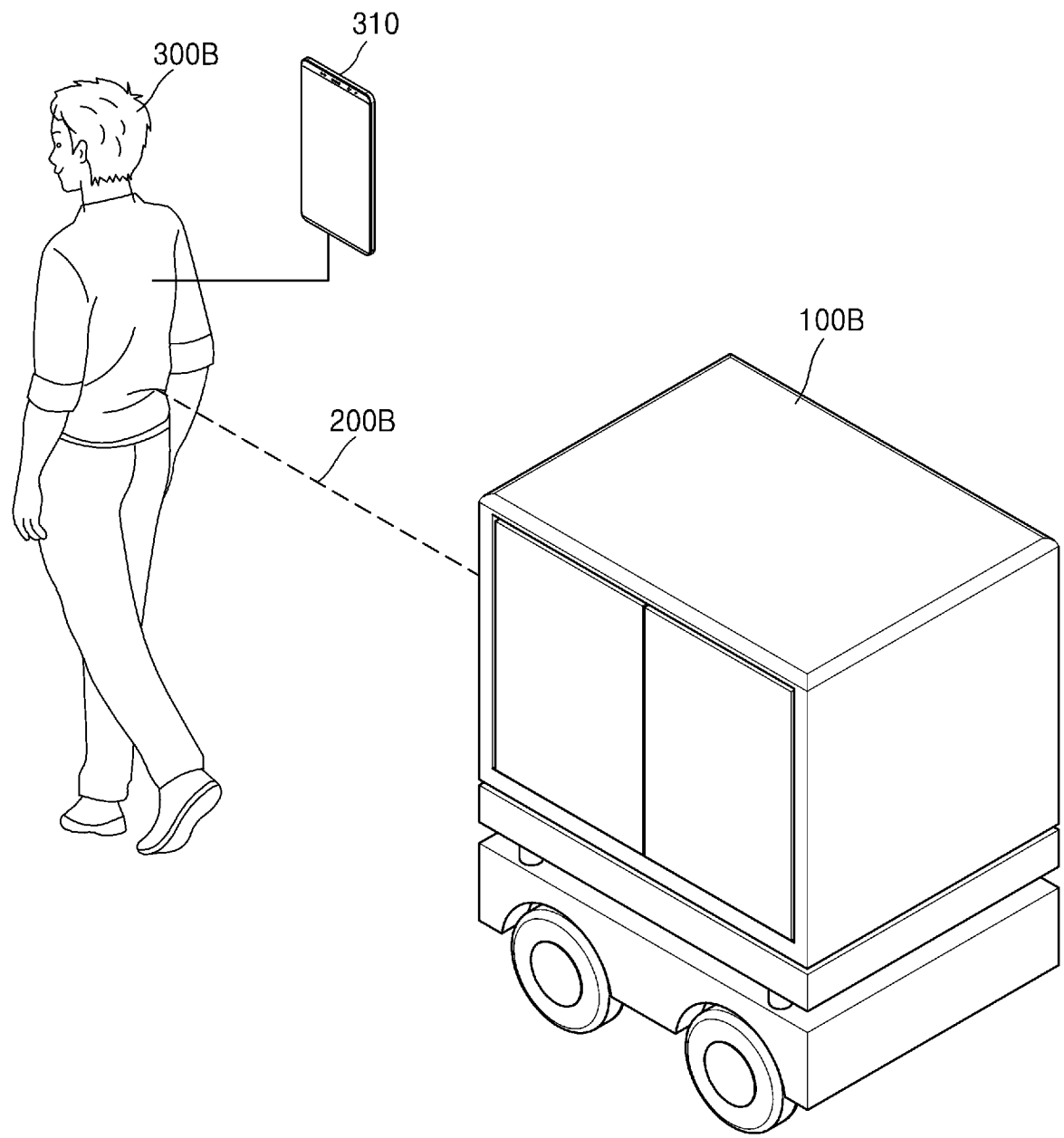

FIGS. 1 and 2 are schematic diagrams illustrating a system for controlling a movement path of a mobile vehicle according to an exemplary embodiment.

A movement path control system of a mobile vehicle according to an embodiment of the present disclosure may control mobile vehicles 100A and 100B based on a line between a mobile vehicle 100A and a user 300A and/or between a mobile vehicle 100B and a user 300B. For example, the mobile vehicle control system according to an embodiment may control the mobile vehicle 100A based on a string 200A between the mobile vehicle 100A and the user 300A.

Here, "line" may refer to a line connecting a mobile vehicle and a user, and may be in the form of a physical string or a virtual line.

For example, the line may be a virtual line corresponding to the string 200A physically connecting the mobile vehicle 100A to the user 300A as shown in FIG. 1. In addition, the line may be a line corresponding to a wireless communication path 200B between the mobile vehicle 100B and a user terminal 310 of the user 300B, as shown in FIG. 2.

However, the above-described lines are exemplary, and any line connecting the mobile vehicle 100A and the user 300A and/or the mobile vehicle 100B and the user 300B may be the line according to the embodiments of the disclosure.

Figure 3:
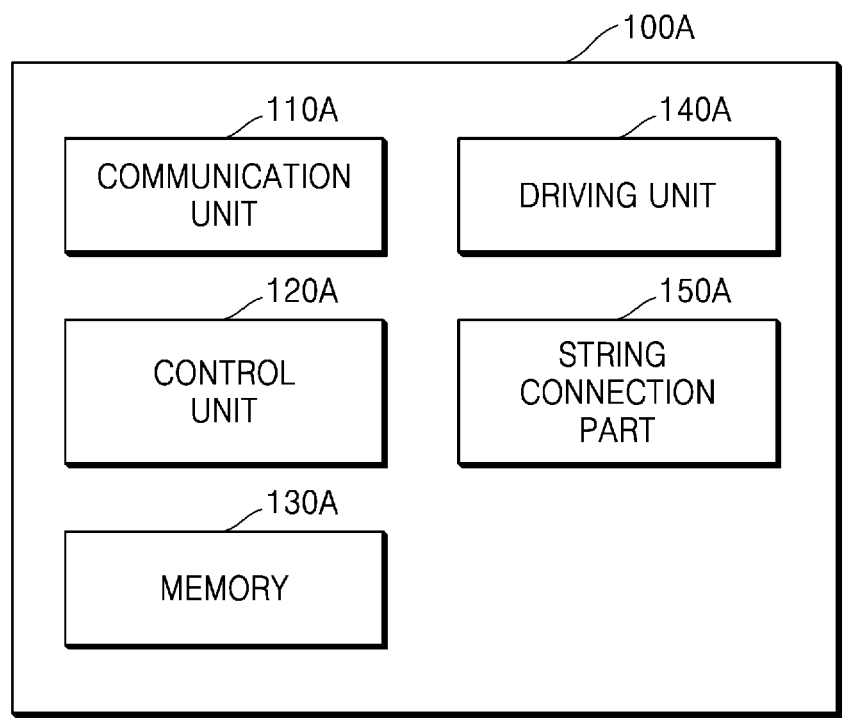
FIG. 3 is a block diagram illustrating a mobile vehicle to which a user is connected by a string according to an exemplary embodiment.

FIG. 3 is a block diagram illustrating a mobile vehicle 100A to which a user 300A is connected by a string 200A (shown in FIG. 1, hereinafter referred to as 'first embodiment').

Referring to FIG. 3, the mobile vehicle 100A according to the first embodiment of the disclosure may include a communication unit 110A, a control unit 120A, a memory 130A, a driving unit 140A, and a string connection part 150A.

The communication unit 110A according to the first embodiment of the disclosure may be a device including hardware and software necessary for transmitting and receiving a signal such as a control signal or a data signal through a wired or wireless connection with another network device.

In the first embodiment of the disclosure, the communication unit 110A may be a device including hardware and software necessary for the user 300A to transmit and receive data with a user terminal (not shown) for controlling and/or managing the mobile vehicle 100A. However, this is merely an example, and the embodiment is not limited thereto.

The control unit 120A according to the first embodiment of the present disclosure may generate a movement path of the mobile vehicle 100A based on a line between the mobile vehicle and the user, and control the mobile vehicle 100A according to the path. In this case, the control unit 120A may include all types of devices capable of processing data, such as a processor. Here, the 'processor' may refer to a data processing device embedded in hardware having a circuit physically structured to perform a function represented by code or instructions included in a program. As an example of a data processing device embedded in the hardware as described above, processing devices may include a microprocessor, a Central Processing Unit (CPU), a processor core, a multiprocessor, an Application-Specific Integrated Circuit (ASIC), a Field Programmable Gate Array (FPGA), and the like, but the embodiment is not limited thereto.

The control unit 120A may include a single processor, or a plurality of processors divided by units of functions performed by the control unit 120A.

The memory 130A according to the first embodiment of the disclosure performs a function of temporarily or permanently storing data, instructions, programs, program code, or a combination thereof processed by the control unit 120A. For example, the memory 130A may temporarily and/or permanently store the movement path generated by the control unit 120A.

The memory 130A may include a magnetic storage medium or a flash storage medium, but the embodiment is not limited thereto.

The driving unit 140A according to the first embodiment of the disclosure may control driving of the mobile vehicle 100A according to a control signal generated by the control unit 120A. For example, the driving unit 140A may rotate the actuator according to a control signal generated by the control unit 120A so that the mobile vehicle 100A moves according to the generated path. However, this is merely an example, and the embodiment is not limited thereto.

The string connection part 150A according to the first embodiment of the disclosure may be connected to the string 200A that physically connects the mobile vehicle 100A to the user 300A to detect one or more physical quantities of a force acting on the string 200A. For example, the string connection part 150A may detect an external force acting on the string 200A and a direction in which such an external force is applied by manipulation of the user 300A and provide the external force and the direction to the control unit 120A. However, this is merely an example, and the embodiment is not limited thereto.

The mobile vehicle 100A according to the first embodiment of the disclosure may further include a sensor unit (not shown) for detecting an obstacle in the surrounding environment. In this case, the sensor unit (not shown) may be composed of various types of sensors. For example, the sensor unit (not shown) may include an image sensor, an infrared sensor, a radar, a lidar, and an ultrasonic sensor. However, this is merely an example, and the embodiment is not limited thereto.

Figure 4:
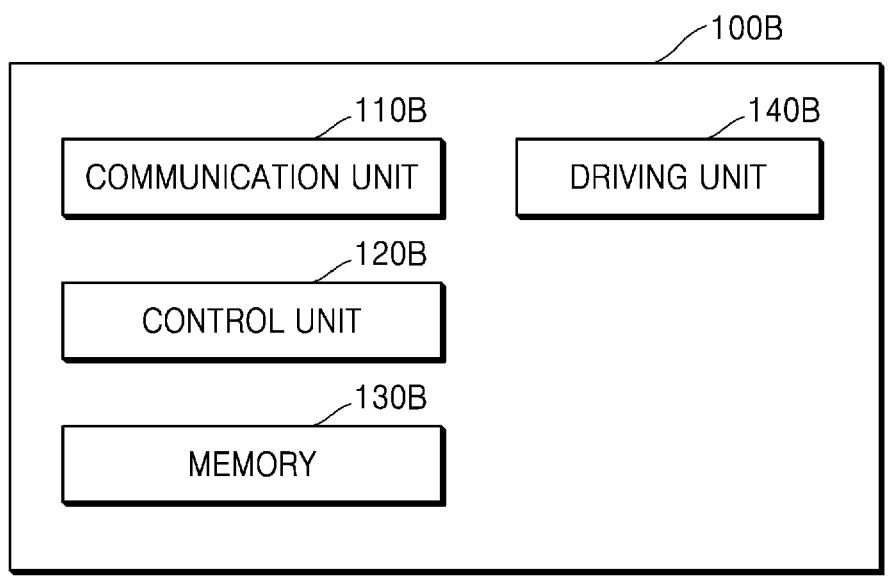
FIG. 4 is a block diagram illustrating a mobile vehicle connected to a user terminal by wireless communication according to an exemplary embodiment.

FIG. 4 is a block diagram illustrating a mobile vehicle 100B connected to the user terminal 310 by wireless communication (shown in FIG. 2, hereinafter referred to as 'second embodiment').

Referring to FIG. 4, the mobile vehicle 100B according to a second embodiment of the disclosure may include a communication unit 110B, a control unit 120B, a memory 130B, and a driving unit 140B.

Except for the string connection part 150A (shown in FIG. 3), because the mobile vehicle 100B according to the second embodiment is the same as the mobile vehicle 100A of the first embodiment, detailed descriptions of the components thereof will be omitted.

Hereinafter, the method of controlling the mobile vehicles 100A and 100B by the control units 120A and 120B, respectively, will be described. In addition, the mobile vehicles 100A and 100B may be also referred to as the mobile vehicle 100 and the users 300A and 300B may be also referred to as the user 300.

Figure 5:
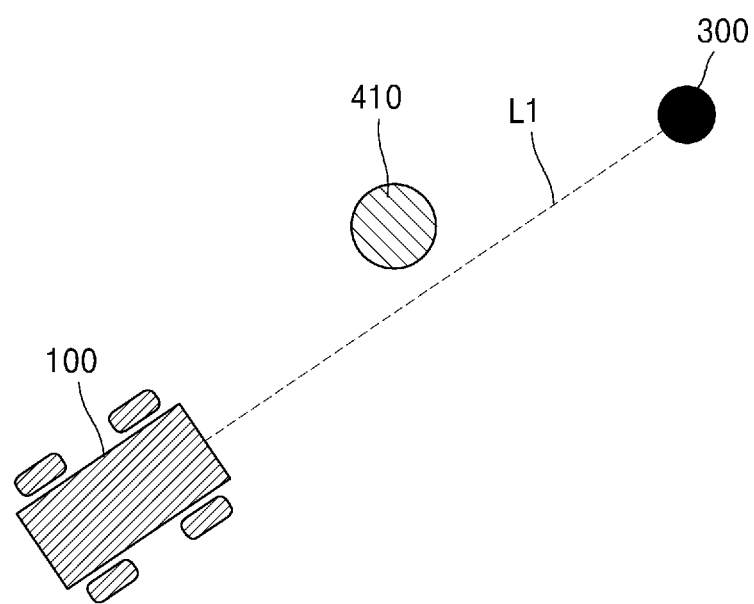
FIG. 5 is a diagram illustrating a first line between a mobile vehicle and a user, and an obstacle around the mobile vehicle according to an exemplary embodiment.

FIG. 5 is a diagram illustrating a first line L1 between a mobile vehicle 100 and a user 300, and an obstacle 410 around the mobile vehicle 100 according to an exemplary embodiment.

The control units 120A and 120B according to embodiments of the disclosure may define a first line L1 between the mobile vehicle 100 and the user 300.

For example, in the first embodiment, the first line L1 may be a physical line corresponding to the string 200A physically connecting the mobile vehicle 100A to the user 300A. Accordingly, the control unit 120A may define the first line L1 based on at least one of the direction of the string 200A and the length of the string 200A.

In the second embodiment, the first line L1 may be a virtual line connecting the mobile vehicle 100B to the user 300B in a straight line. For example, the first line L1 may be a line according to the second embodiment may correspond to a wireless communication path between the mobile vehicle 100B and the user terminal 310 of the user 300B. Accordingly, the control unit 120B may define the first line L1 based on at least one of the direction of the straight line and the length of the straight line.

However, the two methods described above are exemplary, and the embodiments are not limited thereto.

The control units 120A and 120B according to the embodiments of the disclosure may check the position and size of each of the one or more obstacles 410 having a predetermined relationship with the first line L1 defined according to the above-described process.

For example, the control unit 120A according to the first embodiment may identify one or more objects within a predetermined threshold distance from at least a portion of the string 200A and/or the first line L1 as the obstacle 410. In this case, the predetermined threshold distance may be set to various values according to the size, turning radius and/or degree of freedom of the mobile vehicle 100A.

Similarly, the control unit 120B according to the second embodiment may identify one or more objects within a predetermined threshold distance from at least a portion of the first line L1 as the obstacle 410.

The control units 120A and 120B according to embodiments of the disclosure may define a second line using the first line L1, the position of one or more obstacles 410, and the size of the one or more obstacles 410.

Figure 6:
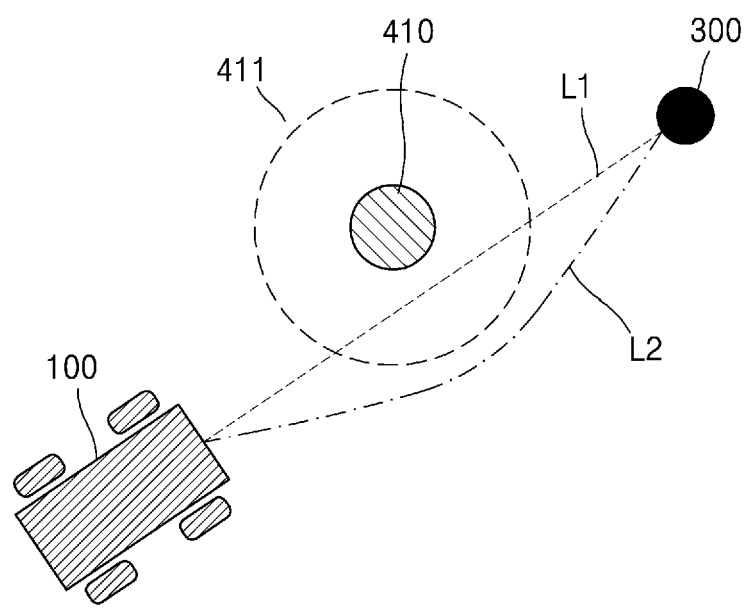
FIG. 6 is a diagram for describing a method of defining a second line by a control unit according to an exemplary embodiment.

FIG. 6 is a diagram for describing a method of defining a second line L2 by the control unit 120A according to an exemplary embodiment.

The control unit 120A according to the first embodiment may generate one or more virtual obstacles 411 of which a size is enlarged at a predetermined ratio based on the position and size of each of the one or more obstacles 410.

In other words, the control unit 120A may generate the enlarged virtual obstacle 411 by expanding the size of the obstacle 410 at a predetermined ratio. In this case, the control unit 120A may maintain a predetermined reference position (for example, a center point) of the virtual obstacle 411 to be the same as a predetermined reference position of the obstacle 410 in generating the virtual obstacle 411.

Moreover, when the first line L1 overlaps one or more virtual obstacles 411, the control unit 120A according to the first embodiment may define a second line L2 by modifying at least a partial section of the first line L1 based on the outline of one or more virtual obstacles 411.

For example, the control unit 120A may define a second line L2 along the outline of one or more virtual obstacles 411, and may define the second line L2 such that a distance between at least a portion of an outline of the one or more virtual obstacles 411 and at least a portion of the second line L2 is equal to or greater than a predetermined threshold distance.

For example, as shown in FIG. 6, the control unit 120A may define a second line L2 such that the first line L1 is pushed away from the center direction of the one or more virtual obstacles 411 by the one or more virtual obstacles 411 to have a shape that does not overlap the outline of the one or more virtual obstacles 411.

Figure 7:
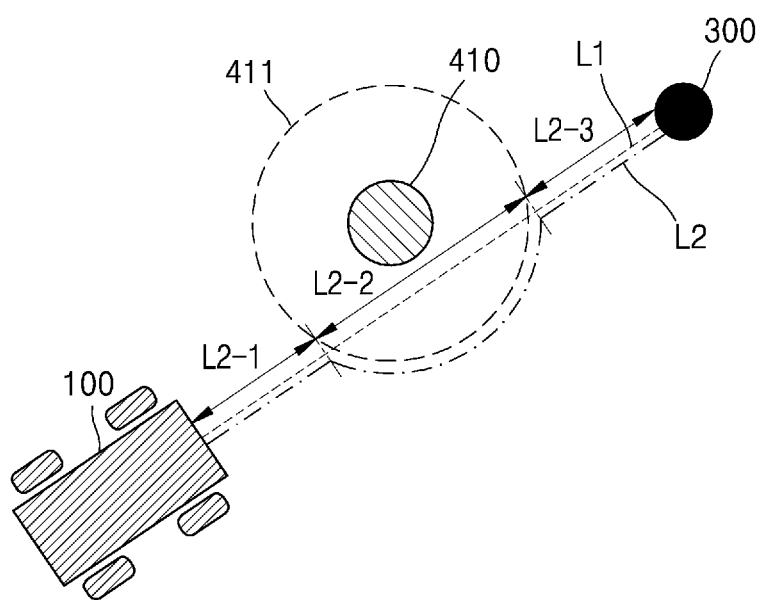
FIG. 7 is a diagram for describing a method of defining a second line by a control unit according to another exemplary embodiment.

FIG. 7 is a diagram for describing a method of defining a second line L2 by the control unit 120B according to another exemplary embodiment.

The control unit 120B according to the second embodiment may generate one or more virtual obstacles 411 of which a size is enlarged at a predetermined ratio based on the position and size of each of the one or more obstacles 410.

In other words, the control unit 120B may generate the enlarged virtual obstacle 411 by expanding the size of the obstacle 410 at a predetermined ratio. Here, the control unit 120B may maintain a predetermined reference position (e.g., a center point) of the virtual obstacle 411 to be equal to a predetermined reference position of the obstacle 410.

Moreover, when the first line L1 overlaps one or more virtual obstacles 411, the control unit 120B according to the second embodiment may define a second line L2 by modifying at least a partial section of the first line L1 based on the outline of one or more virtual obstacles 411.

For example, the control unit 120B may define the second line L2 along the outline of one or more virtual obstacles 411, and may define the second line L2 such that a distance between at least a portion of an outline of the one or more virtual obstacles 411 and at least a portion of the second line L2 is equal to or greater than a predetermined threshold distance.

For example, referring to FIG. 7, the control unit 120B may define a second line L2 such that the second line L2 is composed of portions L2-1 and L2-3 that are along the first line L1 and a portion L2-2 along the outline of the one or more virtual obstacles 411.

In other words, the control unit 120B may also define the second line L2 to be composed of the portions L2-1 and L2-3 that are the same as the first line L1 and a portion L2-2 that is transformed according to the outline of the one or more virtual obstacles 411.

However, such a method is exemplary, and the embodiment is not limited thereto.

Figure 8:
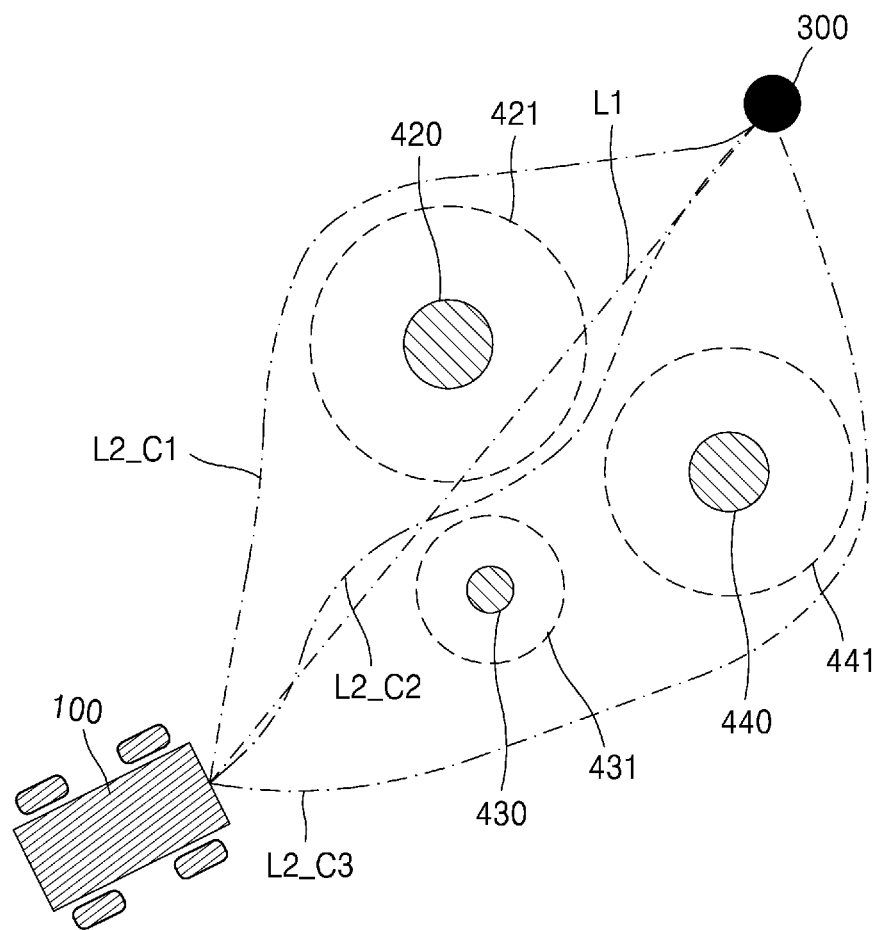
FIG. 8 is a diagram illustrating a plurality of second line candidates according to an exemplary embodiment.

In an embodiment, the control units 120A and 120B may generate a plurality of second line candidates L2_C1, L2_C2, and L2_C3, as shown in FIG. 8, and determine any one of the plurality of second line candidates L2_C1, L2_C2, and L2_C3 as the second line L2 according to a predetermined rule. In this case, the predetermined rule may be, for example, a rule for selecting a line having a minimum moving distance or a rule for selecting a line having the smallest maximum steering angle of the mobile vehicle 100 when moving according to a corresponding path. However, this is merely an example, and the embodiment is not limited thereto.

On the other hand, as in the example shown in FIG. 8, when there are a plurality of obstacles 420, 430, and 440, the control units 120A and 120B may generate virtual obstacles 421, 431, and 441 for the plurality of respective obstacles 420, 430, and 440. Based on defining the plurality of virtual obstacles, the control units may generate a plurality of second line candidates L2_C1, L2_C2, and L2_C3. The method of generating the plurality of second line candidates L2_C1, L2_C2, and L2_C3 by the control units 120A and 120B is the same as the method described with reference to FIGS. 6 and 7, and thus a detailed description thereof will be omitted.

The control units 120A and 120B according to the embodiments may control the mobile vehicle 100 according to the direction and size of the external force on the second line L2.

Figure 9:
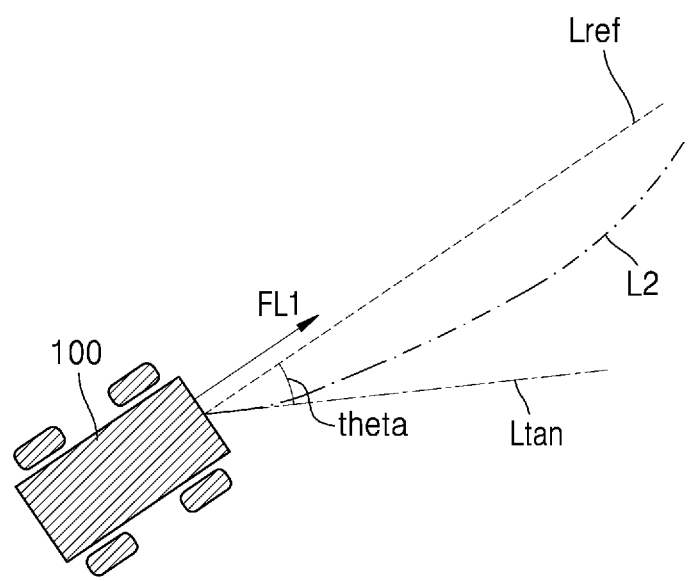
FIG. 9 is a diagram for describing a method of controlling a mobile vehicle based on a second line defined by control units according to an exemplary embodiment.

FIG. 9 is a diagram for describing a method of controlling the mobile vehicle 100 based on the second line L2 defined by the control units 120A and 120B according to an exemplary embodiment.

The control units 120A and 120B according to embodiments may determine the moving direction of the mobile vehicle 100 based on an angle theta between a predetermined reference direction Lref of the mobile vehicle 100 and a direction L tan of the second line L2 at one or more locations of the mobile vehicle 100.

In addition, the control unit 120A according to the first embodiment may determine the moving speed of the mobile vehicle 100A based on at least one of the external force FL1 acting on the string 200A and the difference in length between the first line L1 and the second line L2, at one or more locations of the mobile vehicle 100A.

In addition, the control unit 120B according to the second embodiment may determine the moving speed of the mobile vehicle 100B based on at least one of a predetermined reference external force and a difference in length between the first line L1 and the second line L2, at one or more locations of the mobile vehicle 100B.

The control units 120A and 120B according to one or more embodiments move the mobile vehicle 100 with reference to the movement direction and movement speed determined according to the above-described process, so that the user may intuitively control the mobile vehicle 100 to avoid obstacles and move. That is, the mobile vehicle 100 may move more flexibly when following a person.

Figure 10:
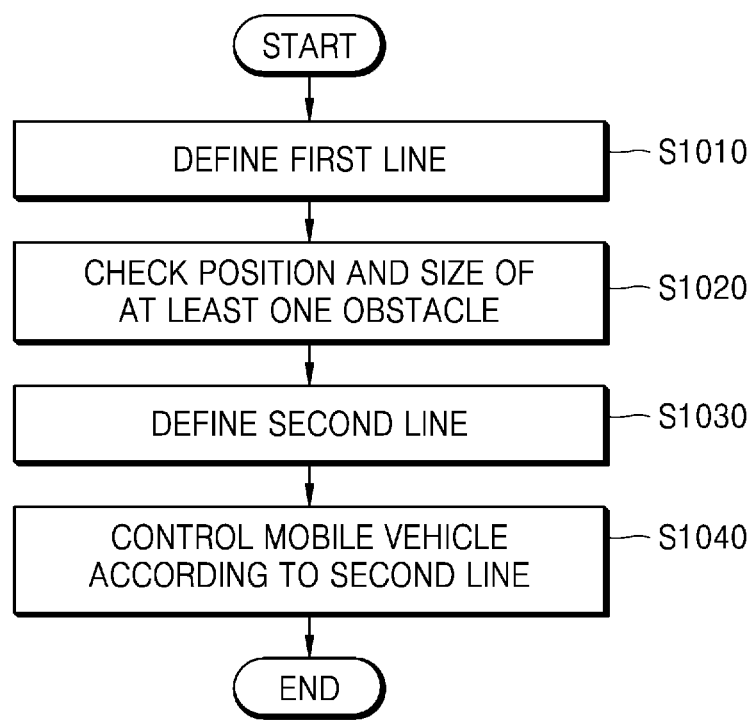
FIG. 10 is a flowchart illustrating a mobile vehicle control method performed by control units according to an exemplary embodiment.

FIG. 10 is a flowchart illustrating a mobile vehicle control method performed by the control units 120A and 120B according to an exemplary embodiment. Hereinafter, descriptions will be made with reference to FIGS. 1 to 10 together, but the descriptions overlapping those described with reference to FIGS. 1 to 9 will be omitted.

The control units 120A and 120B according to embodiments may define a first line L1 between the mobile vehicle 100 and the user 300 (S1010).

FIG. 5 is a diagram illustrating a first line L1 between a mobile vehicle 100 and a user 300 and an obstacle 410 around the mobile vehicle 100 according to embodiments.

For example, in the first embodiment, the first line L1 may be a physical line corresponding to the string 200A physically connecting the mobile vehicle 100A to the user 300A. Accordingly, the control unit 120A may define the first line L1 based on at least one of the direction of the string 200A and the length of the string 200A.

In the second embodiment, the first line L1 may be a virtual line connecting the mobile vehicle 100B to the user 300B in a straight line. For example, the first line L1 may be a virtual line corresponding to a wireless communication path between the mobile vehicle 100B and the user terminal 310 of the user 300B. Accordingly, the control unit 120B may define the first line L1 based on at least one of the direction of the straight line and the length of the straight line.

However, the two methods described above are exemplary, and the embodiments of the disclosure are not limited thereto.

The control units 120A and 120B according to the embodiments may check the position and size of each of the one or more obstacles 410 having a predetermined relationship with the first line L1 defined according to the above-described process (S1020).

For example, the control unit 120A according to the first embodiment may identify one or more objects within a predetermined threshold distance from at least a portion of the string 200A and/or the first line L1 as the obstacle 410. In this case, the predetermined threshold distance may be set to various values according to the size, turning radius and/or degree of freedom of the mobile vehicle 100A.

Similarly, the control unit 120B according to the second embodiment may identify one or more objects within a predetermined threshold distance from at least a portion of the first line L1 as the obstacle 410.

The control units 120A and 120B according to embodiments of the disclosure may define a second line using the first line L1, the position of one or more obstacles 410, and the size of the one or more obstacles 410 (S1030).

FIG. 6 is a diagram for explaining a method of defining a second line L2 by the control unit 120A according to the first embodiment.

The control unit 120A according to the first embodiment may generate one or more virtual obstacles 411 of which a size is enlarged at a predetermined ratio based on the position and size of each of the one or more obstacles 410.

In other words, the control unit 120A may generate the enlarged virtual obstacle 411 by expanding the size of the obstacle 410 at a predetermined ratio. In this case, the control unit 120A may maintain a predetermined reference position (for example, a center point) of the virtual obstacle 411 to be the same as a predetermined reference position of the obstacle 410 in generating the virtual obstacle 411.

Moreover, when the first line L1 overlaps one or more virtual obstacles 411, the control unit 120A according to the first embodiment may define a second line L2 by modifying at least a partial section of the first line L1 based on the outline of one or more virtual obstacles 411.

For example, the control unit 120A may define a second line L2 along the outline of one or more virtual obstacles 411, and may define the second line L2 such that a distance between at least a portion of an outline of the one or more virtual obstacles 411 and at least a portion of the second line L2 is equal to or greater than a predetermined threshold distance.

For example, as shown in FIG. 6, the control unit 120A may define a second line L2 such that the first line L1 is pushed away from the center direction of the one or more virtual obstacles 411 to have a shape that does not overlap the one or more virtual obstacles 411.

FIG. 7 is a diagram for explaining a method of defining a second line L2 by the control unit 120B according to the second embodiment.

The control unit 120B according to the second embodiment may generate one or more virtual obstacles 411 of which a size is enlarged at a predetermined ratio based on the position and size of each of the one or more obstacles 410.

In other words, the control unit 120B may generate the enlarged virtual obstacle 411 by expanding the size of the obstacle 410 at a predetermined ratio. Here, the control unit 120B may maintain a predetermined reference position (e.g., a center point) of the virtual obstacle 411 to be equal to a predetermined reference position of the obstacle 410.

Moreover, when the first line L1 overlaps one or more virtual obstacles 411, the control unit 120B according to the second embodiment may define a second line L2 by modifying at least a partial section of the first line L1 based on the outline of one or more virtual obstacles 411.

For example, the control unit 120B may define the second line L2 along the outline of one or more virtual obstacles 411, and may define the second line L2 such that a distance between at least a portion of an outline of the one or more virtual obstacles 411 and at least a portion of the second line L2 is equal to or greater than a predetermined threshold distance.

For example, the control unit 120B may define a second line L2 as shown in FIG. 7 such that the second line L2 is composed of the portions L2-1 and L2-3 along the first line L1 and a portion L2-2 along the outline of the one or more virtual obstacles 411.

In other words, the control unit 120B may define the second line L2 to be composed of the portions L2-1 and L2-3 that are the same as the first line L1 and a portion L2-2 that is transformed according to the outline of one or more virtual obstacles 411.

However, such a method is exemplary, and the one or more embodiments of the disclosure are not limited thereto.

In an embodiment, the control units 120A and 120B may generate a plurality of second line candidates L2_C1, L2_C2, and L2_C3, as shown in FIG. 8, and determine any one of the plurality of second line candidates L2_C1, L2_C2, and L2_C3 as the second line L2 according to a predetermined rule. In this case, the predetermined rule may be, for example, a rule for selecting a line having a minimum moving distance or a rule for selecting a line having the smallest maximum steering angle of the mobile vehicle 100 generated when moving according to a corresponding path. However, this is merely an example, and the embodiment is not limited thereto.

On the other hand, as in the example shown in FIG. 8, when there are a plurality of obstacles 420, 430, and 440, the control units 120A and 120B may generate virtual obstacles 421, 431, and 441 for the plurality of respective obstacles 420, 430, and 440. Based on the generated virtual obstacles, the control units may generate a plurality of second line candidates L2_C1, L2_C2, and L2_C3. The method of generating the plurality of second line candidates L2_C1, L2_C2, and L2_C3 by the control units 120A and 120B is the same as the method described with reference to FIGS. 6 to 7, and thus a detailed description thereof will be omitted.

The control units 120A and 120B according to the embodiments may control the mobile vehicle 100 according to the direction and size of the external force on the second line L2 (S1040).

FIG. 9 is a diagram for describing a method of controlling the mobile vehicle 100 according to the second line L2 by the control units 120A and 120B according to an exemplary embodiment.

The control units 120A and 120B according to embodiments may determine the moving direction of the mobile vehicle 100 based on the angle theta between a predetermined reference direction Lref based on the mobile vehicle 100 and a direction L tan of the second line L2, at one or more locations of the mobile vehicle 100.

In addition, the control unit 120A according to the first embodiment may determine the moving speed of the mobile vehicle 100A based on at least one of the external force FL1 acting on the string 200A and the difference in length between the first line L1 and the second line L2, at one or more locations of the mobile vehicle 100A.

In addition, the control unit 120B according to the second embodiment may determine the moving speed of the mobile vehicle 100B based on at least one of a predetermined reference external force and a difference in length between the first line L1 and the second line L2, at one or more locations of the mobile vehicle 100B.

The control units 120A and 120B according to embodiments control the mobile vehicle 100 to move with reference to the movement direction and movement speed determined according to the above-described process, so that the user may intuitively control the mobile vehicle 100 to avoid obstacles. That is, the mobile vehicle 100 may move more flexibly when following a person.

The one or more embodiments described above may be implemented in the form of a computer program that can be executed through various components on a computer, and such a computer program may be recorded in a computer-readable medium. In this case, the medium may include magnetic media such as hard disks, floppy disks, and magnetic tapes, optical recording media such as CD-ROM and DVD, magneto-optical medium such as a floptical disk, and a hardware device specially configured to store and execute program instructions such as ROM, RAM, flash memory, and the like. Further, the medium may include an intangible medium implemented in a form that can be transmitted on a network, and may be a medium that is implemented in the form of software or an application, for example, and may be transmitted and distributed through a network. In addition, the computer-readable medium may be non-transitory or non-volatile computer-readable medium.

Further, the computer program may be specially designed and configured for the one or more embodiments of the disclosure, or may be readily apparent to those skilled in the art. Examples of the computer program may include not only machine language code such as those produced by a compiler, but also high-level language code that can be executed by a computer using an interpreter or the like.

According to the embodiments of the disclosure, a mobile vehicle, such as a robot, may move more flexibly when following a user.

In addition, the user may intuitively control the mobile vehicle, and the mobile vehicle may avoid obstacles along the path.

It should be understood that embodiments described herein should be considered in a descriptive sense only and not for the purpose of limiting the scope of the disclosure. Additional features or aspects of each embodiment should be considered as included in the one or more embodiments described above. While one or more embodiments have been described with reference to the accompanying drawings, it will be understood by those of ordinary skill in the art that various changes in form and details may be made therein without departing from the spirit and scope of the disclosure as defined by the following claims.

What is claimed is:

1. A method of controlling a mobile vehicle based on a line between the mobile vehicle and a user, the method comprising:
    defining a first line between the mobile vehicle and the user;
    determining a position and a size of each of at least one obstacle having a predetermined relationship with the first line;
    generating at least one virtual obstacle, wherein a size of the at least one virtual obstacle is enlarged by a predetermined ratio based on the position and the size of each of the at least one obstacle;
    determining whether at least a partial section of the first line overlaps the at least one virtual obstacle;
    based on determining that at least the partial section of the first line overlaps the at least one virtual obstacle, defining a second line by modifying at least the partial section of the first line that overlaps the at least one virtual obstacle; and
    controlling the mobile vehicle according to a direction of the second line.

2. The method of claim 1, wherein the first line is a string connecting the mobile vehicle to the user, and wherein the defining of the first line comprises defining the first line based on at least one of a direction of the string and a length of the string.

3. The method of claim 2, wherein the determining of the position of the at least one obstacle and the size of the at least one obstacle comprises identifying at least one object within a predetermined threshold distance from at least a portion of the string as the at least one obstacle.

4. The method of claim 1, wherein the defining of the second line comprises:
defining the second line such that a distance between at least a portion of an outline of the at least one virtual obstacle and at least a portion of the second line is equal to or greater than a predetermined threshold distance.

5. The method of claim 1, wherein the first line is a virtual line connecting the mobile vehicle to the user in a straight line, and
wherein the defining of the first line comprises defining the first line based on at least one of a direction of the straight line and a length of the straight line.

6. The method of claim 5, wherein the first line is a line corresponding to a wireless communication path between the mobile vehicle and a terminal of the user.

7. The method of claim 5, wherein the determining of the position of the at least one obstacle and the size of the at least one obstacle comprises identifying at least one object that is within a predetermined threshold distance from at least a portion of the first line as the at least one obstacle.

8. The method of claim 5, wherein the defining of the second line further comprises:
generating a plurality of second line candidates; and
determining any one of the plurality of second line candidates as the second line according to a predetermined rule.

9. The method of claim 5, wherein the defining of the second line comprises defining the second line such that a distance between at least a portion of an outline of the at least one virtual obstacle and at least a portion of the second line is equal to or greater than a predetermined threshold distance.

10. The method of claim 5, wherein the controlling of the mobile vehicle comprises:
determining a moving direction of the mobile vehicle based on an angle between a predetermined reference direction with respect to the mobile vehicle and the second line at one or more positions of the mobile vehicle; and
determining a moving speed of the mobile vehicle based on at least one of a predetermined reference external force and a difference in length between the first line and the second line at the one or more positions of the mobile vehicle.

11. A mobile vehicle configured to move along a movement path based on a line between the mobile vehicle and a user, the mobile vehicle comprising:
a string connection part attached to one end of a string connecting the mobile vehicle to the user; and
a processor configured to:
define a first line between the mobile vehicle and the user,
determine a position and a size of each of at least one obstacle having a predetermined relationship with the first line,
generate at least one virtual obstacle, wherein a size of the at least one virtual obstacle is enlarged by a predetermined ratio based on the position and the size of each of the at least one obstacle;
determine whether at least a partial section of the first line overlaps the at least one virtual obstacle;
based on determining that at least the partial section of the first line overlaps the at least one virtual obstacle, define a second line by modifying at least the partial section of the first line that overlaps the at least one virtual obstacle, and
control the mobile vehicle according to a direction of the second line.

12. A system for controlling a movement path of a mobile vehicle based on a line between the mobile vehicle and a user, the system comprising:
the mobile vehicle; and
a user terminal configured to generate a virtual line between the mobile vehicle and the user,
wherein the mobile vehicle comprises a processor configured to:
define a first line with reference to a wireless communication path between the mobile vehicle and the user terminal,
determine a position and a size of each of at least one obstacle having a predetermined relationship with the first line,
generate at least one virtual obstacle, wherein a size of the at least one virtual obstacle is enlarged by a predetermined ratio based on the position and the size of each of the at least one obstacle;
determine whether at least a partial section of the first line overlaps the at least one virtual obstacle;
based on determining that at least the partial section of the first line overlaps the at least one virtual obstacle, define a second line by modifying at least the partial section of the first line that overlaps the at least one virtual obstacle, and
control the mobile vehicle according to a direction of the second line.

* * * * *